United States Patent [19]

Martinez

[11] 4,059,945
[45] Nov. 29, 1977

[54] RAKE CLEANING ATTACHMENT

[76] Inventor: Robert Martinez, 2340 San Diego Ave., Ramona, Calif. 92065

[21] Appl. No.: 688,273

[22] Filed: May 20, 1976

[51] Int. Cl.² ............................................ A01D 7/00
[52] U.S. Cl. ................................................ 56/400.1
[58] Field of Search .............. 56/400.08, 400.09, 400.1

[56] References Cited

U.S. PATENT DOCUMENTS

| | | | |
|---|---|---|---|
| 1,136,770 | 4/1915 | Brewer | 56/400.1 |
| 1,310,541 | 7/1919 | Patterson | 56/400.1 |
| 1,677,635 | 7/1928 | Howe et al. | 56/400.1 X |
| 1,864,264 | 6/1932 | Velkover | 56/400.1 |
| 2,126,105 | 8/1938 | Goheen | 56/400.1 |
| 2,874,530 | 2/1959 | Miller, Sr. | 56/400.1 |

Primary Examiner—Russell R. Kinsey
Attorney, Agent, or Firm—Strauch, Nolan, Neale, Nies & Kurz

[57] ABSTRACT

An attachment for cleaning accumulated debris from a rake. An ejector member is pivotally mounted on the rake and a plurality of clearing members eject debris clogging the tines. A handle is connected to an actuating rod that is connected to the ejector member. A return spring is active between the handle and the actuating rod to return the handle to a nominal position.

3 Claims, 11 Drawing Figures

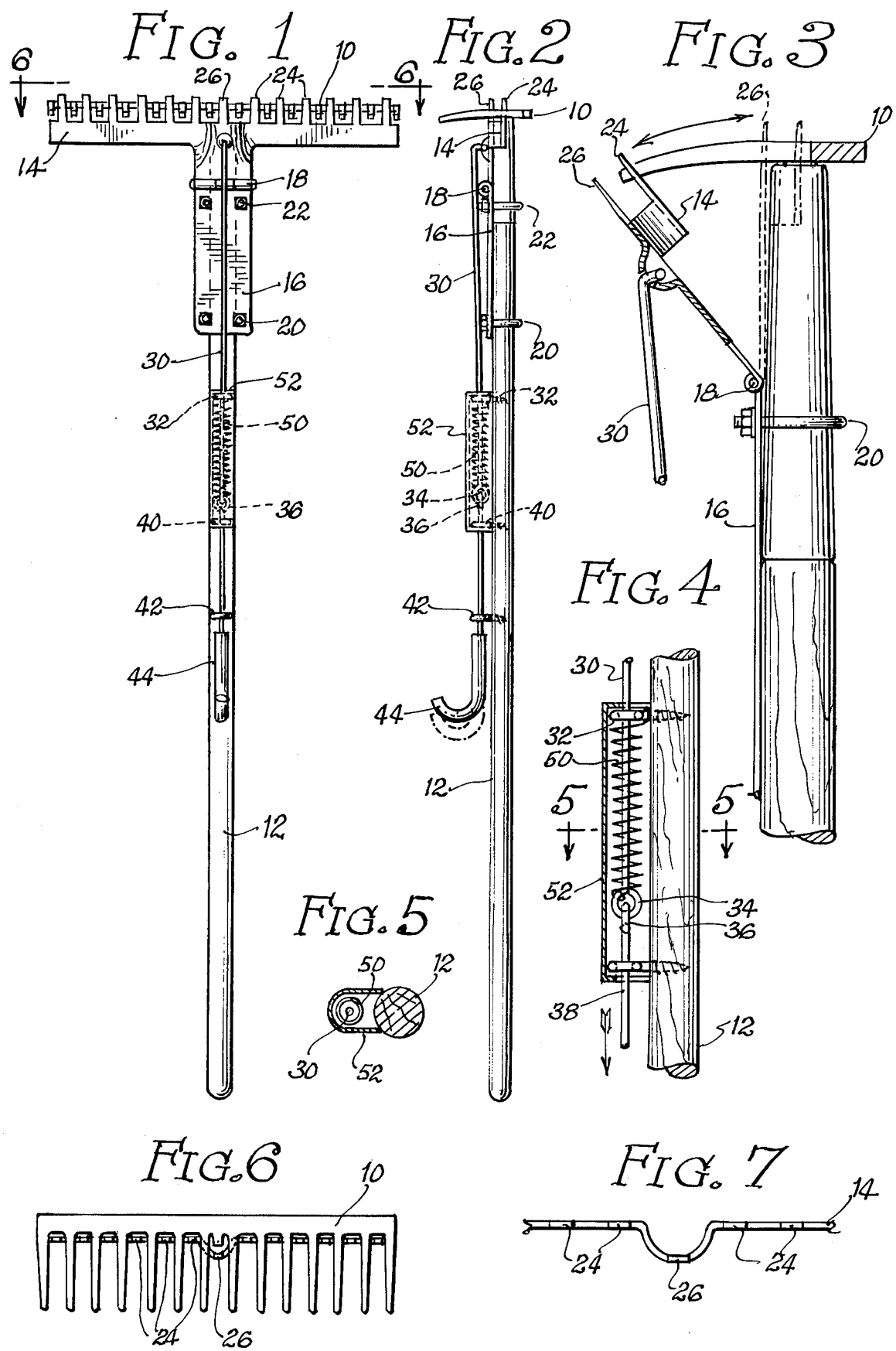

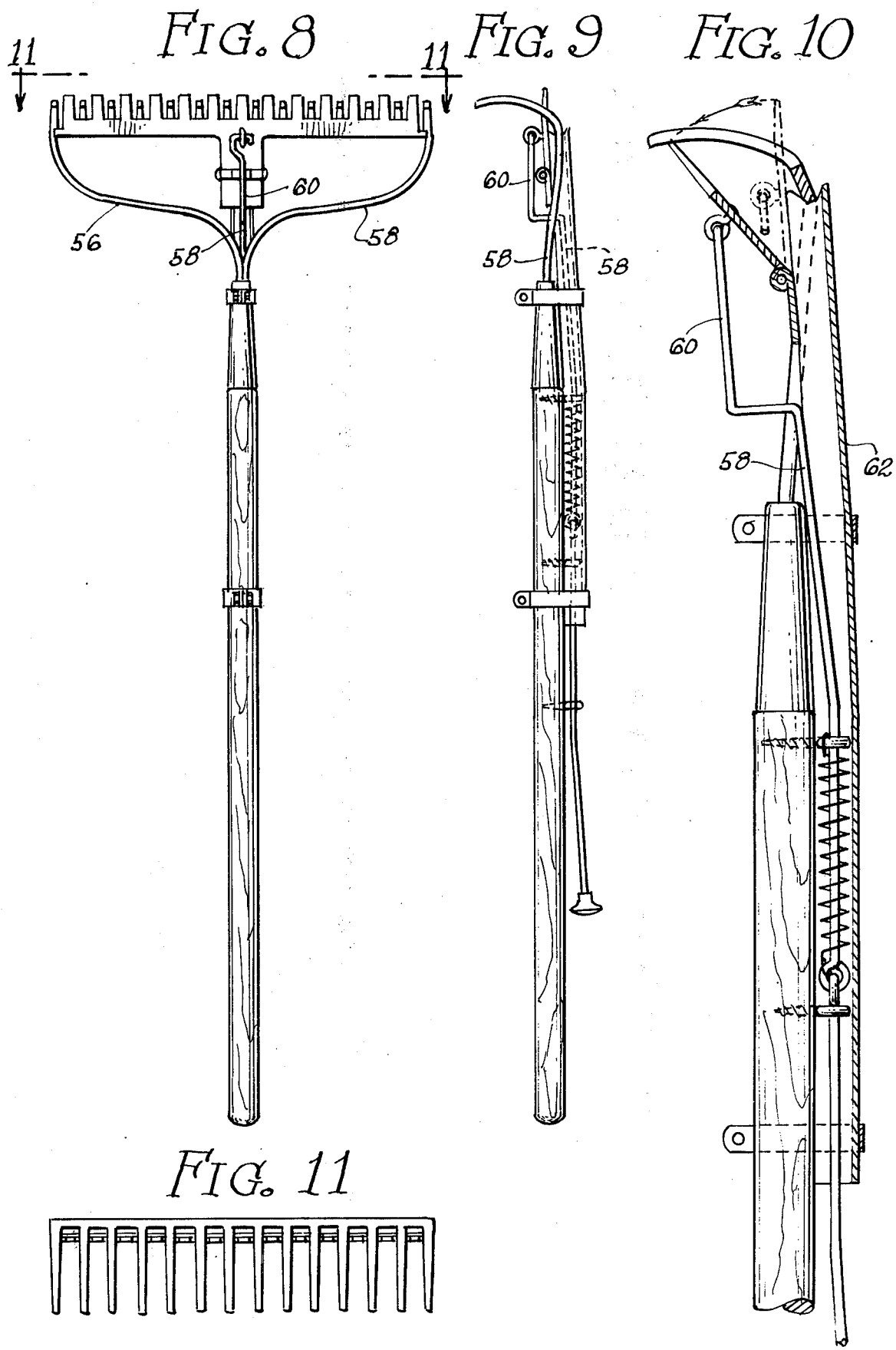

RAKE CLEANING ATTACHMENT

BACKGROUND OF THE INVENTION

The instant invention relates to an attachment for clearing the tines of a rake.

Rakes are a staple of almost all gardening and farming tasks. The rake is a simple, primitive tool for which there have been virtually no improvements in many generations.

The most common problem associated with rakes is the tendency for the tines to become clogged with debris such as grass, leaves, dirt and paper.

A variety of cleaning devices have been designed to facilitate clearing the rake of debris. The prior art devices have for one reason or another been deficient in performing the desired task. Primarily, the prior art devices have been costly and complicated, have inadequately performed the assigned task or have been structurally deficient.

Therefore, there has been a need for a device which effectively clears the rake tines with a simple inexpensive and efficient construction.

SUMMARY OF THE INVENTION

In an exemplary embodiment of the invention an ejector member is supported adjacent the rake tines. The ejector member is pivotal away from the tines. The ejector member has a series of clearing members each received between tines of the rake. The clearing members pivot with the ejector member to dislodge debris that accumulate about the rake teeth.

The ejector member is manipulated by an actuating rod controlled by a handle. A return means or spring returns the ejector member to a nominal position.

The above and other aspects of the invention will be apparent as the description continues and when read in conjuncton with the appended drawings.

BRIEF DESCRIPTION OF THE DRAWINGS

FIG. 1, is an elevation view of the preferrred embodiment.

FIG. 2, is a side view of the structure of FIG. 1.

FIG. 3, is a fragmentary sectional view of the ejector member.

FIG. 4, is a fragmentary enlarged view of the return spring structure.

FIG. 5, is a view taken along the line 5—5 of FIG. 4.

FIG. 6, is a view taken along the line 6—6 of FIG. 1.

FIG. 7, is a fragmentary view of an enlarged detail of the ejector member.

FIG. 8, is a view of an alternative embodiment of the invention.

FIG. 9, is a view similar to FIG. 2, of the alternative embodiment.

FIG. 10, is an enlarged view partially in section of the alternative embodiment.

FIG. 11, is a view taken along the line 11—11 of FIG. 8.

DETAILED DESCRIPTION

In the preferred embodiment of the invention, the attachment is illustrated as used with a rake in which the tines 10 emanate from the rake handle 12. The attachment includes an ejector member 14 that is pivotally connected to a hinge plate 16, about the hinge 18. The hinge plate 16 is connected to the rake by means of "U" bolts 20, 22. Both the hinge plate 16 and the ejector member 14 have arcuate central parts for abutting engagement with the lower part of the handle 12.

The ejector member 14 has a plurality of teeth 24 that are received between the tines 10 of the rake. When the ejector member 14 is pivoted the fingers 24 clear accumulated debris from the tines 10. Since the center finger 26 is formed on the arcuate part of the ejector member 14, it is slightly forward of the other fingers 24.

An actuating rod 30 connects to the ejector member 14 and when pulled, it pivots that ejector member. The rod 30 is supported generally parallel to the rake handle 12 and is restrained within the screw guide 32. The rod 30 is connected (via hooks 34, 36) to a handle rod 38. Rod 30 is thus pivotally connected at opposite ends to ejector member 14 and handle rod 38, and as shown in FIG. 3 rod 30 rocks about the hook pivot 34, 36 when handle rod 38 is pulled toward the dotted line position of FIG. 2. Handle rod 38 is retained within the screw guides 40, 42. The handle 44 enables the user to conveniently pull the attachment to dislodge debris. The screw guide 40 acts as a limiting stop preventing pulling the mechanism past the clearing position. The hook 36 abuts the screw guide 40 and cannot be received therethrough. A return spring is active between the screw guide 32 and the hook 36. Also, a box 52 encloses the spring 50 and the screw guides 32, 40.

Turning now to FIGS. 8 to 11, the attachment is illustrated in conjunction with a rake of the type that has the tines connected to extension rods 56, 58. In this embodiment the component parts function similarly with those of the previous embodiment. However, the primary components are supported behind the tines 10 and the rod 58 is bent to project from behind the tines 10 to the front thereof. The components are housed in the box 62 which is clamped via clamps 64, 66 to the handle 12.

Modifications and adaptations in the method and materials of fabrication, in the configuration and assemblage of the constituent components are readily permissible without departing from the scope of the claims.

Having described my invention, I now claim:

1. In combination with a rake having an elongated handle and a series of spaced tines projecting from a common base element at one end of said handle, support member secured to said handle near said one end, an ejector member pivoted at one end on said support member and formed at the other end with a series of tine cleaning projections extending through the spaces between adjacent tines, said ejector member being movable between a normal retracted position where said projections are disposed at the bases of said tines and an extended position where said projections are disposed at the tips of said tines, a manual pull member longitudinally slidably mounted on said handle for movement generally parallel to said handle, an actuating rod pivotally connected at opposite ends to said ejector member and said pull member, resilient means on said handle connected to said actuating rod for biasing said rod to dispose said ejector member in retracted position, and means on said handle coacting with said pull member providing a limiting stop to prevent said ejector member from being displaced beyond the tips of said tines in said extended position.

2. The combination defined in claim 1, wherein said support member is a plate attached to said handle, and the ejector member is pivoted to the end of the plate nearest said tines.

3. The combination defined in claim 1, wherein said resilient means is a coil tension spring surrounding said actuating rod with one end attached to said actuating rod and the other end fixed to said handle.

* * * * *